Sept. 21, 1943.                H. W. ROMANOFF                    2,330,009
                                 WIRE CUTTER
                              Filed June 3, 1942
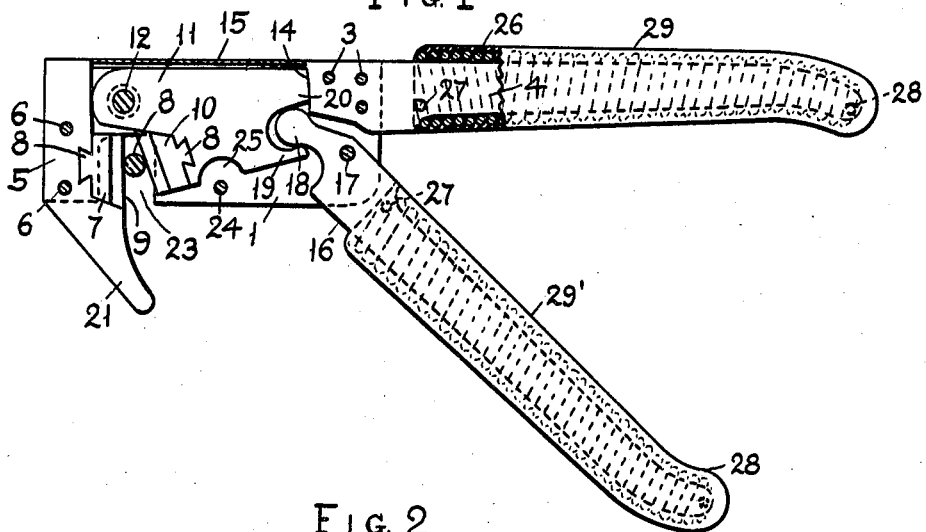
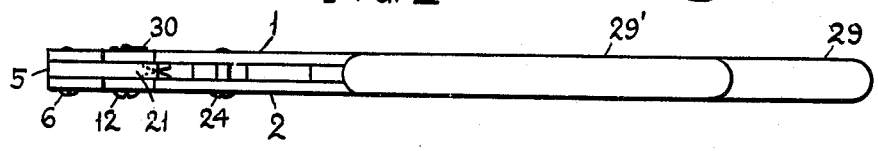
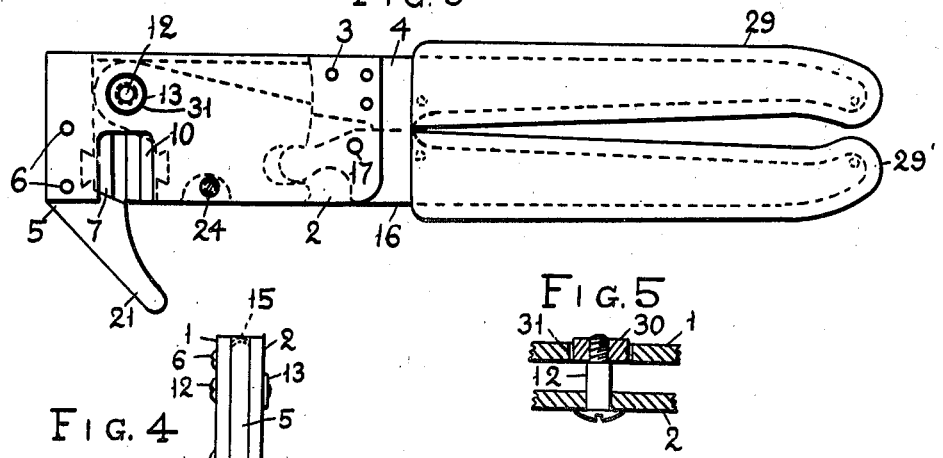
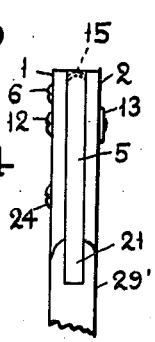
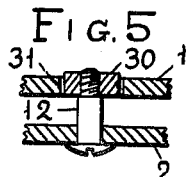
*Hippolyte W. Romanoff*
INVENTOR
BY
*John P. Wronow*
ATTORNEY Patented Sept. 21, 1943

2,330,009

UNITED STATES PATENT OFFICE 2,330,009

WIRE CUTTER

Hippolyte W. Romanoff, New York, N. Y.

Application June 3, 1942, Serial No. 445,633

5 Claims. (Cl. 30—189)

My invention relates to wire cutters and has particular reference to pocket type portable cutters.

My invention has for its object to provide a cutter which can be carried in a pocket, being of a relatively small size, but which is sufficiently strong to cut the toughest steel wire such as is used for barb wire fences and wire entanglements. My cutter is therefore especially suitable for the use by military patrols, parachute troops, "Commandos" and other army troops.

In my patent application Serial No. 440,512, filed April 25, 1942, I disclosed an improved type of a cutter for steel wire, the movable jaw of the cutter being provided with a removable cutting insert. I have found, however, that the insert must be considerably reduced in size in view of the fact that the best results are obtained with an expensive high grade alloy steel. For the same reason it was found necessary to use a similar insert in the stationary jaw, the two inserts being identical in shape and interchangeable. Considerable economy in the use of alloy steel is thereby effected, simplifying at the same time the manufacture and replacements since only one type of cutting insert is needed for both, stationary and movable jaws.

Another object of my invention is to provide strong and durable insulation casings for the handles in order to render the device safe for use on electrically charged wires and, also, to make their use easier for the operator's hands.

Various plastic materials are usually employed for this purpose, moulded directly on the handles. I have found, however, that a large amount of plastic material required adds considerably to the cost of production, and besides, the plastic, when used in a heavy layer, is apt to crack or break off when struck with a sharp object.

In my cutter I make the insulation for the handles by tightly winding a cord, made of a suitable non-conducting or insulating material such as asbestos, glass yarn, etc., the cord being then dipped or moulded with a suitable plastic. The resultant covering or jacket is very tough and resists a great deal of abuse, being at the same time easy for the hands and having good insulating properties.

My invention is more fully described in the accompanying specification and drawing in which—

Fig. 1 is a sectional side view of my cutter in an open or inoperative position;

Fig. 2 is an edge view of the same;

Fig. 3 is a similar view of the cutter in a closed or operative position; and

Fig. 4 is an end view of the same.

Fig. 5 is an enlarged detail view of a pivot for the movable jaw.

My wire cutter consists of a yoke made of two steel plates 1 and 2 held together at the rear by rivets 3, passing through the front end of a stationary handle 4. A stationary jaw 5 is placed between the front ends of the plates 1 and 2 and is held by screws 6. An insert 7 is fitted by its dove-tailed end 8 into a corresponding slot in the jaw 5, the insert having a cutting edge 9 at the rear side. An identical insert 10 is fitted by its dove-tailed end 8 into a corresponding slot in a movable jaw 11 which is pivoted at the front end on a screw 12. The threaded end of the screw is held by a round nut 13, rotatively fitted in a corresponding hole 31 in the plate 1 so that rotation of the jaw 11 or of the screw will have no tendency to tighten or to release the nut.

The rear end of the movable jaw is of an arcuate shape at 14, concentric with the screw or pivot 12 and slidably engaged similarly shaped front end of the stationary handle 4. The sliding connection between these parts provides for a dust-proof enclosure for the inner parts of the device. An additional protection is provided by a shield bar 15, slidably fitted in grooves in the plates 1 and 2 and held in place by the upper end of the stationary jaw 5. In the fully opened position of the cutter the upper edge of the movable jaw abuts the shield bar 15 as shown in Fig. 1.

A movable handle 16 is pivoted at 17 between the plates 1 and 2 and has a rounded front end 18, engaged by prongs 19, 20 at the rear end of the movable jaw. A double leverage is thereby obtained for moving the jaw 11 against the stationary jaw 5.

The stationary jaw has a curved extension 21 for guiding a wire 22 to be cut into a slot 23 between the jaw inserts 7 and 10.

The plates 1 and 2 are additionally reinforced by a screw 24, the movable jaw having a recess 25 for this screw.

The cutting inserts 7 and 10 are so made that they are interchangeable and can be fitted equally well into the stationary and movable jaws. The manufacture of the wire cutter is thereby simplified with a corresponding reduction in cost, even if the inserts are made of a high grade alloy steel.

Insulating jackets for the handles are made by tightly winding a rope or cord 26, preferably of a non-conducting material such as asbestos, glass threads, etc. The ends of the cord are fitted in holes 27, 28 in the handles. A plastic insulating composition 29, 29—1 is moulded over the cords under suitable pressure and at an increased temperature so that the fibres of the cord become fully impregnated with this composition. The resultant covering for the handles is very strong and resists sharp blows, wear and other abuses, while affording sufficient protection against electric shocks when the cutter is used for cutting charged wires.

It is understood that my cutter may be modified without departing from the spirit of my invention as set forth in the appended claims.

I claim as my invention:

1. A wire cutter comprising a hollow flat member with side walls; a stationary handle attached to the rear end of the member; a stationary jaw attached at the front end of the member between the walls; a movable jaw pivotally supported at the front end in the member in cooperation with the stationary jaw; a movable handle pivotally supported at the rear end of the member; a short extension at the front end of the movable handle; prongs at the rear end of the movable jaw engaging the extension of the movable handle; the movable handle, when moved toward the stationary handle, being thereby adapted to bring the movable jaw against the stationary jaw; and interchangeable identical sharp cutting inserts removably fitted in the inner edges of the stationary and movable jaws and retained in position by the side walls of the hollow member.

2. A wire cutter comprising a member formed of two flat plates; a stationary jaw removably fitted between the front ends of the plates; a stationary handle fitted between the rear ends of the plates; a movable jaw pivotally supported between the plates in a cooperative relation to the stationary jaw; a movable handle pivotally supported between the plates, having a short extension at the front end, the rear end of the movable jaw being operatively connected to the extension of the movable handle, and a shield slidably fitted in grooves in the plates along their upper edges, the front end of the shield being retained in its place by the upper end of the stationary jaws.

3. A wire cutter comprising a hollow flat member; a stationary handle attached to the rear end of the member; a stationary jaw attached at the front end of the member; a movable jaw pivotally supported at the front end in the member in cooperation with the stationary jaw; a movable handle pivotally supported at the rear end of the member; a short extension at the front end of the movable handle; operative connections between the extension of the movable handle and rear end of the movable jaw for moving the jaws together when the movable handle is moved against the stationary handle; flexible cords tightly wound on the handles; and layers of an insulating composition moulded over the cords on the handles and forming jackets for the handles.

4. A wire cutter comprising a hollow flat member; a stationary handle attached to the rear end of the member; a stationary jaw attached at the front end of the member; a movable jaw pivotally supported at the front end in the member in cooperation with the stationary jaw; a movable handle pivotally supported at the rear end of the member; a short extension at the front end of the movable handle; operative connections between the extension of the movable handle and rear end of the movable jaw for moving the jaws together when the movable handle is moved against the stationary handle; flexible cords tightly wound on the handles; the ends of the cords being fitted in holes provided therefor in the handles, the cords being impregnated with an insulating plastic composition forming jackets for the handles.

5. A wire cutter comprising a hollow flat member; a stationary handle attached to the rear end of the member; a stationary jaw attached at the front end of the member; a movable jaw pivotally supported at the front end in the member in cooperation with the stationary jaw; a movable handle pivotally supported at the rear end of the member; a short extension at the front end of the movable handle; operative connections between the extension of the movable handle and rear end of the movable jaw for moving the jaws together when the movable handle is moved against the stationary handle; flexible cords tightly wound on the handles; and made of non-conducting fibers; and layers of a plastic composition moulded over the cords and forming jackets for the handles.

HIPPOLYTE W. ROMANOFF.